United States Patent
Zhuo et al.

(10) Patent No.: US 11,374,697 B2
(45) Date of Patent: Jun. 28, 2022

(54) FEEDBACK METHOD, APPARATUS, AND SYSTEM

(71) Applicant: HUAWEI TECHNOLOGIES CO., LTD., Shenzhen (CN)

(72) Inventors: Yibin Zhuo, Shanghai (CN); Jinlin Peng, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 51 days.

(21) Appl. No.: 16/923,026

(22) Filed: Jul. 7, 2020

(65) Prior Publication Data
US 2020/0366418 A1    Nov. 19, 2020

Related U.S. Application Data

(63) Continuation of application No. PCT/CN2019/070566, filed on Jan. 7, 2019.

(30) Foreign Application Priority Data

Jan. 12, 2018 (CN) .......................... 201810032724.2

(51) Int. Cl.
*H04L 1/18*    (2006.01)
*H04L 1/00*    (2006.01)

(52) U.S. Cl.
CPC .......... *H04L 1/1812* (2013.01); *H04L 1/0057* (2013.01); *H04L 1/1861* (2013.01)

(58) Field of Classification Search
CPC ... H04W 28/04; H04W 72/04; H04W 72/042; H04W 88/08; H04L 5/0007; H04L 1/0057; H04L 1/1861; H04L 1/1812
(Continued)

(56) References Cited

U.S. PATENT DOCUMENTS

2009/0077430 A1 * 3/2009 Cho ...................... H04L 1/0072
                                                            714/701
2011/0310820 A1 * 12/2011 Liao ...................... H04L 5/0055
                                                            370/329
(Continued)

FOREIGN PATENT DOCUMENTS

CN         104938017 A * 9/2015 ........ H04W 72/1268
CN         105612711 A * 5/2016 ........... H04L 1/1812
CN         107370576 A * 11/2017 ........... H04L 1/1812

(Continued)

OTHER PUBLICATIONS

3GPP TSG RAN WG1 Meeting #89, Hangzhou, China, May 15-19, 2017, R1-1708026, Agenda item: 7.1.3.3.3, Source: Samsung, Title: HARQ-ACK Feedback Timing. (Year: 2017).*

(Continued)

*Primary Examiner* — Peter G Solinsky
*Assistant Examiner* — Sanjay K Dewan
(74) *Attorney, Agent, or Firm* — Stein IP, LLC

(57) ABSTRACT

A feedback method, an apparatus, and a system, which relate to the field of communications technologies. The method includes: a terminal device receiving configuration information sent by a network device, where the configuration information is used to indicate K time sequence relationships, the K time sequence relationships are respectively used for HARQ feedback on K downlink frequency domain resources, and K is a positive integer greater than or equal to 2; and the terminal device sending HARQ feedback information to the network device, where a quantity of downlink control channel monitoring occasions corresponding to the HARQ feedback information is determined based on the K time sequence relationships. According to the foregoing solution, the network device and the terminal device have a unified understanding on the HARQ feedback information. In this way, system robustness is improved.

20 Claims, 5 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2015/0215082 A1* | 7/2015 | Agiwal | H04W 72/0446 370/336 |
| 2015/0333878 A1* | 11/2015 | Yu | H04L 1/1861 370/329 |
| 2015/0365965 A1 | 12/2015 | Wu et al. | |
| 2017/0195103 A1 | 7/2017 | Guan et al. | |
| 2017/0331577 A1 | 11/2017 | Parkvall et al. | |
| 2018/0376490 A1* | 12/2018 | Lunttila | H04W 72/1268 |
| 2019/0036654 A1* | 1/2019 | Kim | H04L 5/14 |
| 2021/0314095 A1* | 10/2021 | Gao | H04L 1/1887 |

OTHER PUBLICATIONS

3GPP TSG RAN WG1 #89, Hangzhou, China, May 15-19, 2017, R1-1708027, Agenda item: 7.1.3.3, Source: Samsung, Title: HARQ-ACK Feedback for Numerology Multiplexing. (Year: 2017).*

3GPP TSG RAN WG1 Meeting #89, Hangzhou, China, May 15-19, 2017, R1-1706961, Agenda item: 7.1.3.3.3, Source: Huawei, HiSilicon, Title: HARQ feedback timing for NR. (Year: 2017).*

3GPP TSG RAN WG1 Meeting #91, Reno, USA, Nov. 27-Dec. 1, 2017, R1-1719383, Agenda Item: 7.3.4.2, Source: Huawei, HiSilicon, Title: Remaining issues on NR CA and DC including SRS Switching. (Year: 2017).*

3GPP TSG RAN Meeting 78, Lisbon, Portugal, Dec. 18-Dec. 21, 2017, RP-172390, Source: ZTE, Sanechips, Orange, Deutsche Telekom, CMCC, Title: On the Support of different numerologies in one PUCCH group, Agenda Item: 9.2.1. (Year: 2017).*

3GPP TSG RAN WG1 Meeting #91 :"Remaining issues on NR CA and DC including SRS switching",Huawei, HiSilicon,Reno, USA, Nov. 27-Dec. 1, 2017,R1-1719383,total 18 pages.

Samsung, "R1-1708026 HARQ-ACK Feedback Timing", 3GPP TSG RAN WG1 #89, (May 19, 2017),total 3 pages.

3GPP TSG RAN WG1 #89:"HARQ-ACK Feedback for Numerology Multiplexing",Samsung,R1-1708027,Hangzhou, China, May 15 19, 2017,total 4 pages.

Huawei HiSilicon, "R1-1712208 Discussion on data transmission duration", 3GPP TSG RAN WG1 Meeting #90, (Aug. 25, 2017),total 7 pages.

3GPP TSG RAN WG1 Meeting #89:"HARQ feedback timing for NR ",Huawei, HiSilicon,R1-1706961,Hangzhou, China, May 15-19, 2017,total 3 pages.

Huawei et al,"Overview of bandwidth part, CA, and DC operation including SRS switching", 3GPP TSG RAN WG1 Meeting NR#3, R1-1715425, Nagoya, Japan, Sep. 18-21, 2017, total 14 pages.

Zte et al,"On the support of different numerologies in one PUCCH group", 3GPP TSG RAN Meeting 78, RP-172390, Lisbon, Portugal, Dec. 18-Dec. 2017, total 10 pages.

* cited by examiner

FEEDBACK METHOD, APPARATUS, AND SYSTEM

CROSS-REFERENCE TO RELATED APPLICATIONS

This application is a continuation of International Application No. PCT/CN2019/070566, filed on Jan. 7, 2019, which claims priority to Chinese Patent Application No. 201810032724.2, filed on Jan. 12, 2018, The disclosures of the aforementioned applications are hereby incorporated by reference in its entirety.

TECHNICAL FIELD

This application relates to the field of communications technologies, and in particular, to a feedback method, an apparatus, and a system.

BACKGROUND

With continuous development of communications technologies, a new radio (NR) technology is proposed, to meet different requirements of users for various services. In NR, an RF bandwidth capability of a terminal device is less than a carrier bandwidth. For example, the carrier bandwidth may be up to 400 megahertz (MHz), and the RF bandwidth capability of the terminal device may be 20 MHz, 50 MHz, 100 MHz, or the like. To enable the terminal device to perform normal communication, a bandwidth part (BWP) is introduced. Specifically, a system parameter (for example, a subcarrier spacing) may be configured for the BWP, to meet different service requirements.

A new hybrid automatic repeat request (HARQ) feedback mode needs to be designed, to adapt to a new radio access technology.

SUMMARY

This application proposes a feedback method, an apparatus, and a system, to help improve reliability and accuracy of data transmission in NR.

According to a first aspect, a feedback method in an embodiment of this application includes:

receiving, by a terminal device, configuration information sent by a network device, where the configuration information is used to indicate K time sequence relationships, the K time sequence relationships are respectively used for HARQ feedback on K downlink frequency domain resources, the K downlink frequency domain resources are configured by the network device for the terminal device, and K is a positive integer greater than or equal to 2; and sending, by the terminal device, HARQ feedback information to the network device, where a quantity of downlink control channel monitoring occasions corresponding to the HARQ feedback information is determined based on the K time sequence relationships.

When K is greater than or equal to 2, the quantity of downlink control channel monitoring occasions corresponding to the HARQ feedback information is determined based on the K time sequence relationships. When the HARQ feedback is performed on a plurality of downlink frequency domain resources, a unified rule is defined for determining the quantity of downlink control channel monitoring occasions and further determining a quantity of feedback information bits, so that a wireless network access device and the terminal device have a unified understanding on the HARQ feedback information. In this way, system robustness is improved.

In a possible design, the quantity of downlink control channel monitoring occasions corresponding to the HARQ feedback information is determined based on a quantity of parameters obtained by finding a union of K parameter sets corresponding to the K time sequence relationships. The foregoing technical solution is applicable to a scenario in which the network device configures a plurality of downlink frequency domain resources for the terminal device and activates one downlink frequency domain resource at a time.

In a possible design, the quantity of downlink control channel monitoring occasions is further determined based on a largest subcarrier spacing in subcarrier spacings corresponding to the K downlink frequency domain resources, and a subcarrier spacing of an uplink frequency domain resource on which the HARQ feedback information is located. The foregoing technical solution is applicable to a scenario in which the network device configures a plurality of downlink frequency domain resources for the terminal device and configuration parameters (for example, subcarrier spacings) of the downlink frequency domain resources are different.

In a possible design, the quantity of downlink control channel monitoring occasions corresponding to the HARQ feedback information is determined based on a sum of K quantities of K sub downlink control channel monitoring occasions, and the K sub downlink control channel monitoring occasions are determined based on K quantities of parameters in K parameter sets corresponding to the K time sequence relationships. The foregoing technical solution is applicable to a scenario in which the network device configures a plurality of downlink frequency domain resources for the terminal device and activates a plurality of downlink frequency domain resources at a time.

According to the foregoing technical solution, when the HARQ feedback is performed on a plurality of downlink frequency domain resources, a unified rule is defined for determining the quantity of downlink control channel monitoring occasions and further determining the quantity of feedback information bits, so that the wireless network access device and the terminal device have a unified understanding on the HARQ feedback information. In this way, system robustness is improved.

In a possible design, the K quantities of sub downlink control channel monitoring occasions are further determined based on subcarrier spacings corresponding to the K downlink frequency domain resources and a subcarrier spacing of an uplink frequency domain resource on which the HARQ feedback information is located. The foregoing technical solution is applicable to a scenario in which the network device configures a plurality of downlink frequency domain resources for the terminal device and configuration parameters (for example, subcarrier spacings) of the downlink frequency domain resources are different.

In a possible design, the HARQ feedback information includes code block group CBG-based HARQ feedback information.

According to a second aspect, a feedback method in an embodiment of this application includes:

sending, by a network device, configuration information to a terminal device, where the configuration information is used to indicate K time sequence relationships, the K time sequence relationships are respectively used for hybrid automatic repeat request HARQ feedback on K downlink frequency domain resources, the K downlink frequency domain resources are configured by the network device for the terminal device, and K is a positive integer greater than or equal to 2; and receiving, by the network device, HARQ feedback information sent by the terminal device, where a quantity of downlink control channel monitoring occasions corresponding to the HARQ feedback information is determined based on the K time sequence relationships.

In a possible design, the quantity of downlink control channel monitoring occasions corresponding to the HARQ feedback information is determined based on a quantity of parameters obtained by finding a union of K parameter sets corresponding to the K time sequence relationships.

In a possible design, the quantity of downlink control channel monitoring occasions is further determined based on a largest subcarrier spacing in subcarrier spacings corresponding to the K downlink frequency domain resources, and a subcarrier spacing of an uplink frequency domain resource on which the HARQ feedback information is located.

In a possible design, the quantity of downlink control channel monitoring occasions corresponding to the HARQ feedback information is determined based on a sum of K quantities of K sub downlink control channel monitoring occasions, and the K sub downlink control channel monitoring occasions are determined based on K quantities of parameters in K parameter sets corresponding to the K time sequence relationships.

In a possible design, the K quantities of sub downlink control channel monitoring occasions are further determined based on subcarrier spacings corresponding to the K downlink frequency domain resources and a subcarrier spacing of an uplink frequency domain resource on which the HARQ feedback information is located.

In a possible design, the HARQ feedback information includes code block group CBG-based HARQ feedback information.

According to a third aspect, an apparatus in an embodiment of this application includes a receiving module and a sending module. The receiving module is configured to receive configuration information sent by a network device, where the configuration information is used to indicate K time sequence relationships, the K time sequence relationships are respectively used for hybrid automatic repeat request HARQ feedback on K downlink frequency domain resources, the K downlink frequency domain resources are configured by the network device for the apparatus, and K is a positive integer greater than or equal to 2. The sending module is configured to send HARQ feedback information to the network device, where a quantity of downlink control channel monitoring occasions corresponding to the HARQ feedback information is determined based on the K time sequence relationships.

In a possible design, the quantity of downlink control channel monitoring occasions corresponding to the HARQ feedback information is determined based on a quantity of parameters obtained by finding a union of K parameter sets corresponding to the K time sequence relationships.

In a possible design, the quantity of downlink control channel monitoring occasions is further determined based on a largest subcarrier spacing in subcarrier spacings corresponding to the K downlink frequency domain resources, and a subcarrier spacing of an uplink frequency domain resource on which the HARQ feedback information is located.

In a possible design, the quantity of downlink control channel monitoring occasions corresponding to the HARQ feedback information is determined based on a sum of K quantities of K sub downlink control channel monitoring occasions, and the K sub downlink control channel monitoring occasions are determined based on K quantities of parameters in K parameter sets corresponding to the K time sequence relationships.

In a possible design, the K quantities of sub downlink control channel monitoring occasions are further determined based on subcarrier spacings corresponding to the K downlink frequency domain resources and a subcarrier spacing of an uplink frequency domain resource on which the HARQ feedback information is located.

In a possible design, the HARQ feedback information includes code block group CBG-based HARQ feedback information.

In a possible design, the apparatus is a terminal device, or the apparatus is a chip.

It should be noted that a hardware implementation corresponding to the receiving module is a receiver, and a hardware implementation corresponding to the sending module is a transmitter. A function of the receiver and a function of the transmitter may be integrated into one hardware module, in which case the receiver and the transmitter are jointly referred to as a transceiver. Alternatively, the receiver and the transmitter may be separate hardware units.

According to another aspect of embodiments of this application, a chip is further provided. The chip is connected to a transceiver and a memory, and is configured to read and execute a program stored in the memory, to trigger the transceiver to implement the feedback method according to any one of the first aspect or the possible designs of the first aspect.

According to still another aspect of embodiments of this application, a computer storage medium is further provided. The computer storage medium stores a computer program, and when the computer program is executed by a processor, the processor is configured to implement the feedback method according to any one of the first aspect or the possible designs of the first aspect.

According to a fourth aspect, an apparatus in an embodiment of this application includes a receiving module and a sending module. The sending module is configured to send configuration information to a terminal device, where the configuration information is used to indicate K time sequence relationships, the K time sequence relationships are respectively used for hybrid automatic repeat request HARQ feedback on K downlink frequency domain resources, the K downlink frequency domain resources are configured by the apparatus for the terminal device, and K is a positive integer greater than or equal to 2. The receiving module is configured to receive HARQ feedback information sent by the terminal device, where a quantity of downlink control channel monitoring occasions corresponding to the HARQ feedback information is determined based on the K time sequence relationships.

In a possible design, the quantity of downlink control channel monitoring occasions corresponding to the HARQ feedback information is determined based on a quantity of parameters obtained by finding a union of K parameter sets corresponding to the K time sequence relationships.

In a possible design, the quantity of downlink control channel monitoring occasions is further determined based on a largest subcarrier spacing in subcarrier spacings corresponding to the K downlink frequency domain resources, and a subcarrier spacing of an uplink frequency domain resource on which the HARQ feedback information is located.

In a possible design, the quantity of downlink control channel monitoring occasions corresponding to the HARQ feedback information is determined based on a sum of K quantities of K sub downlink control channel monitoring occasions, and the K sub downlink control channel monitoring occasions are determined based on K quantities of parameters in K parameter sets corresponding to the K time sequence relationships.

In a possible design, the K quantities of sub downlink control channel monitoring occasions are further determined based on subcarrier spacings corresponding to the K downlink frequency domain resources and a subcarrier spacing of an uplink frequency domain resource on which the HARQ feedback information is located.

In a possible design, the HARQ feedback information includes code block group CBG-based HARQ feedback information.

In a possible design, the apparatus is a network device, or the apparatus is a chip.

It should be noted that a hardware implementation corresponding to the receiving module is a receiver, and a hardware implementation corresponding to the sending module is a transmitter. A function of the receiver and a function of the transmitter may be integrated into one hardware module, in which case the receiver and the transmitter are jointly referred to as a transceiver. Alternatively, the receiver and the transceiver may be separate hardware units.

According to yet another aspect of embodiments of this application, a chip is further provided. The chip is connected to a transceiver and a memory, and is configured to read and execute a program stored in the memory, to trigger the transceiver to implement the feedback method according to any one of the second aspect or the possible designs of the second aspect.

According to still yet another aspect of embodiments of this application, a computer storage medium is further provided. The computer storage medium stores a computer program, and when the computer program is executed by a processor, the processor is configured to implement the feedback method according to any one of the second aspect or the possible designs of the second aspect.

An embodiment of this application further provides a communications system, including the apparatus according to any one of the third aspect or the possible designs of the third aspect, and the apparatus according to any one of the fourth aspect or the possible designs of the fourth aspect.

It should be noted that the K parameter sets corresponding to the K time sequence relationships in any of the foregoing aspects and the possible designs of any aspect in the embodiments of this application mean that each of the K time sequence relationships corresponds to one parameter set.

In addition, for technical effects brought by any possible design manner in the second to the fourth aspects, reference may be made to technical effects brought by different design manners in the first aspect, and details are not described herein again.

An embodiment of this application further provides a method for determining a DCI payload size, including: receiving, by a terminal device, configuration information sent by a network device, where the configuration information includes a target frequency domain resource; and determining, by the terminal device, a size of a frequency domain resource assignment field based on a quantity of resource blocks RBs corresponding to the target frequency domain resource. The target frequency domain resource is one of a default uplink BWP, a default downlink BWP, an initial activated uplink BWP, and an initial activated downlink BWP.

DESCRIPTION OF EMBODIMENTS

The following describes embodiments of this application in detail with reference to accompanying drawings of the specification.

Figure 1:
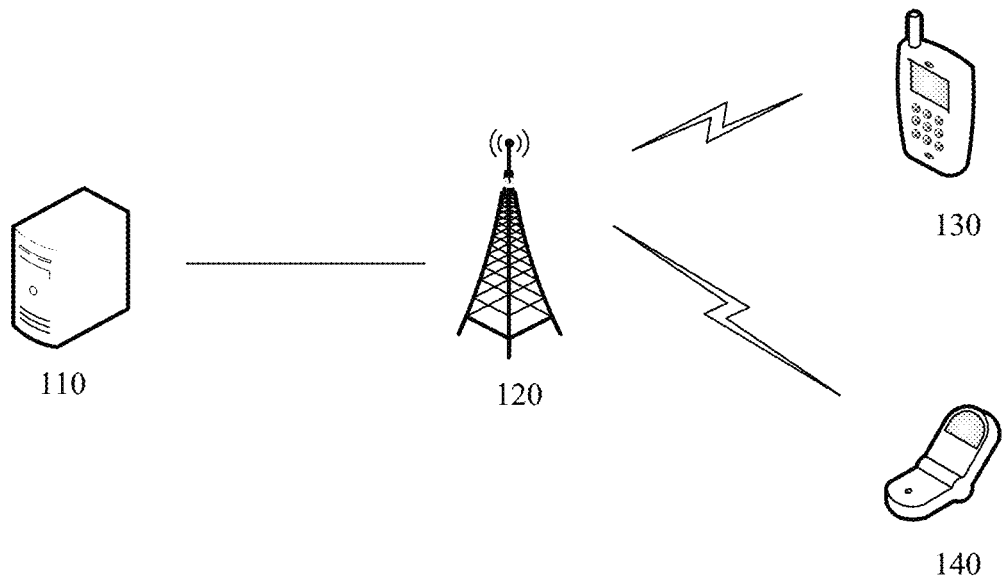
FIG. 1 is a possible schematic architectural diagram of a mobile communications system to which an embodiment of this application is applicable.

FIG. 1 is a possible schematic architectural diagram of a mobile communications system to which an embodiment of this application is applicable. The mobile communications system shown in FIG. 1 includes a core network device 110, a radio access network device 120, a terminal device 130, and a terminal device 140. It should be understood that FIG. 1 is merely a schematic architectural diagram of the mobile communications system. A quantity of core network devices, a quantity of radio access network devices, and a quantity of terminal devices in the mobile communications system are not limited in this embodiment of this application, and the mobile communications system shown in FIG. 1 may further include another device, such as a wireless relay device and a wireless backhaul device. This is not limited in this embodiment of this application. In addition, during specific implementation, functions of the core network device and functions of the radio access network device in the mobile communications system shown in FIG. 1 may be integrated into mutually independent physical devices, or may be integrated into one physical device, or some functions of the core network device and some functions of the radio access network device may be integrated into one physical device. This is not limited in this embodiment of this application. In addition, in the mobile communications system shown in FIG. 1, the terminal device can be connected to the radio access network device in a wireless manner, and the radio access network device can be connected to the core network device in a wireless manner or a wired manner. It should also be noted that the terminal device in the mobile communications system shown in FIG. 1 may be fixed or movable.

The radio access network device in the mobile communications system shown in FIG. 1 is configured to connect the terminal device to the mobile communications system. Specifically, the radio access network device may be a NodeB (node B), an evolved NodeB (evolved node B, eNB), a base station in a 5th-generation (5G) mobile communications system, a base station in a future mobile communications system, an access node in a wireless fidelity (Wi-Fi) system, or the like. A specific technology and specific device form used for the radio access network device are not limited.

The terminal device in the mobile communications system shown in FIG. 1 may also be referred to as a terminal, user equipment (UE), a mobile station (MS), a mobile terminal (MT), or the like. Specifically, the terminal device may be a mobile phone (mobile phone), a tablet computer (pad), a computer with a wireless transmitting and receiving function, a virtual reality (VR) terminal device, an augmented reality (AR) terminal device, a wireless terminal in industrial control (industrial control), a wireless terminal in self driving, a wireless terminal in remote surgery, a wireless terminal in a smart grid (smart grid), a wireless terminal in transportation safety, a wireless terminal in a smart city, a wireless terminal in a smart home, or the like. This is not limited.

It should be understood that the radio access network device and the terminal device in the mobile communications system shown in FIG. 1 may be deployed on land, including indoor or outdoor, and in a handheld or vehicle-mounted manner; or may be deployed on water; or may be deployed in an aircraft, a balloon, and a satellite in the air; and so on. Application scenarios of the radio access network device and the terminal device are not limited.

It should be understood that in the mobile communications system shown in FIG. 1, communication between the radio access network device and the terminal device and communication between terminal devices may be performed by using a licensed spectrum, by using an unlicensed spectrum, or by using both a licensed spectrum and an unlicensed spectrum. This is not limited. Communication between the radio access network device and the terminal device and communication between terminal devices may be performed by using a spectrum below 6 gigahertz (gigahertz, GHz), by using a spectrum above 6 GHz, or by using both a spectrum below 6 GHz and a spectrum above 6 GHz. A spectrum resource used between the radio access network device and the terminal device is not limited in this embodiment of this application.

A network device in the embodiments of this application may be the radio access network device in the mobile communications system shown in FIG. 1, and a terminal device in the embodiments of this application may be the terminal device in the mobile communications system shown in FIG. 1.

The following explains some terms used in the embodiments of this application, to help a person skilled in the art understand technical solutions in the embodiments of this application.

1. HARQ feedback information: HARQ feedback information includes an acknowledgment (acknowledgment, ACK) and a negative acknowledgmentNACK). Specifically, after receiving data sent by a radio access network device, a terminal device feeds back a reception status of the data to the radio access network device. For example, if the terminal device correctly receives the data sent by the radio access network device, the terminal device sends an ACK to the radio access network device; otherwise, the terminal device sends an NACK to the radio access network device. After receiving the NACK, the radio access network device retransmits the data to the terminal device. This manner helps improve reliability and accuracy of data reception by the terminal device.

2. Time sequence relationship: A time sequence relationship may also be referred to as a timing relationship, including one of or a combination to more than one of a first relationship, a second relationship, and a third relationship. Specifically, the first relationship indicates a timing relationship between a time unit used by a terminal device to receive data and a time unit used to send HARQ feedback information of the data; or the first relationship indicates a timing relationship between a time unit used by a terminal device to receive a physical downlink shared channel and a time unit used to send HARQ feedback information corresponding to the physical downlink shared channel. The second relationship indicates a timing relationship between a time unit used by the terminal device to receive downlink scheduling information of data and a time unit used to receive the data, where the downlink scheduling information is used to schedule a frequency domain resource used by the terminal device to receive the data; or the second relationship indicates a timing relationship between a time unit used by the terminal device to receive a physical downlink control channel and a time unit used to receive a physical downlink shared channel, where the physical downlink control channel is used to schedule the physical downlink shared channel. The third relationship indicates a timing relationship between a time unit used by the terminal device to receive downlink scheduling information of data and a time unit used to send HARQ feedback information of the data; or the third relationship indicates a timing relationship between a time unit used by the terminal device to receive a physical downlink control channel and a time unit used to send HARQ feedback information, where the HARQ feedback information corresponds to a physical downlink shared channel scheduled by the physical downlink control channel.

3. Parameter set corresponding to a time sequence relationship: A parameter set corresponding to a time sequence relationship may include one timing set or a combination of a plurality of timing sets. Specifically, when a timing set corresponds to the first relationship, the timing set may also be referred to as a K1 set, and a value therein may be referred to as a K1 value. Specifically, a parameter in the K1 set may indicate a quantity of time units, in time domain, between a time unit used by a terminal device to receive data and a time unit used to send HARQ feedback information of the data. When a timing set corresponds to the second relationship, the timing set may also be referred to as a K0 set, and a value therein may be referred to as a K0 value. Specifically, a parameter in the K0 set may indicate a quantity of time units, in time domain, between a time unit used by the terminal device to receive downlink scheduling information of the data and the time unit used to receive the data. When a timing set corresponds to the third relationship, a parameter in the timing set may indicate a quantity of time units, in time domain, between the time unit used by the terminal device to receive the downlink scheduling information of the data and the time unit used to send the HARQ feedback information of the data. It should be noted that the timing set corresponding to the third relationship may be obtained based on the K0 set and the K1 set. Specifically, parameters in the timing set corresponding to the third relationship are determined based on a sum of each parameter in the K0 set and each parameter in the K1 set. For example, if the K0 set={1, 3}, and the K1 set={2, 4}, sums of all parameters in the K0 set={1, 3} and all parameters in the K1 set={2, 4} are (1+2)=3, (1+4)=5, (3+2)=5, and (3+4)=7. Parameters of different values are selected from the sums of all the parameters in the K1 set={2, 4} and all the parameters in the K0 set={1, 3}, to form the timing set corresponding to the third relationship, and the timing set corresponding to the third relationship is {3, 5, 7}.

That the parameter set corresponding to the time sequence relationship includes the K1 set is used as an example. The K1 set is {1, 2}. If the time unit used to send the HARQ feedback information of the data is the $N^{th}$ time unit, the HARQ feedback information includes feedback information corresponding to data received in the $(N-1)^{th}$ time unit and feedback information corresponding to data received in the $(N-2)^{th}$ time unit.

It should be noted that in the embodiments of this application, the parameter set corresponding to the time sequence relationship may be directly indicated or notified to the terminal device in advance by a network device (for example, a radio access network device). For example, when the time sequence relationship includes the first relationship, the network device directly indicates or notifies, to the terminal device, the parameter set corresponding to the first relationship. For another example, when the time sequence relationship includes the third relationship, the network device may directly indicate or notify, to the terminal device, the parameter set corresponding to the third relationship. For still another example, when the time sequence relationship includes the third relationship, the network device may alternatively indicate or notify a parameter set 1 and a parameter set 2 to the terminal device, where the parameter set 1 corresponds to the first relationship and the parameter set 2 corresponds to the second relationship, and the terminal device obtains, based on the parameter set 1 and the parameter set 2, the parameter set corresponding to the third relationship. Specifically, for a manner in which the parameter set corresponding to the third relationship is determined based on the parameter set 1 and the parameter set 2, reference may be made to a manner in which the parameter set corresponding to the third relationship is obtained based on the K0 set and the K1 set. Details are not described herein again.

4. Time unit: A time unit may include a subframe, a transmission time interval (one transmission time interval is a sum of duration of a plurality of subframes, or a sum of a plurality of transmission time intervals is one subframe), one or more time domain symbols, one or more slots, one or more mini-slots, a combination of a slot and a mini-slot, or the like. This is not limited.

5. Downlink control channel monitoring occasion: A downlink control channel monitoring occasion may also be referred to as a physical downlink control channel (PDCCH) monitoring occasion. Specifically, the downlink control channel monitoring occasion may be monitoring on downlink control information in various formats. The downlink control channel monitoring occasion includes various types of downlink control information that may be used to schedule downlink data, including not only a DCI format 1/1A/1B/1C/1D/2/2A/2B/2C in LTE, a DCI format 1_0/1_1 in NR, and the like, but also activation of downlink semi-persistent scheduling (SPS) data transmission within the downlink control channel monitoring occasion. When downlink SPS data transmission is considered, given that semi-persistent scheduling is a periodic service and that a time sequence relationship of semi-persistent scheduling is relatively fixed, when there is only one semi-persistent service between a radio access network device and a terminal device and a time sequence relationship points to an uplink feedback time unit, only one time of downlink SPS data channel feedback is added on the uplink feedback time unit; when there are only N semi-persistent services between a radio access network device and a terminal device and time sequence relationships corresponding to the N semi-persistent services point to a same uplink feedback time unit, N times of downlink SPS data channel feedback need to be added on the uplink feedback time unit. A feedback information bit of SPS data may be arranged after feedback information of non-SPS data, or may be arranged in a manner the same as that of a feedback information bit of the non-SPS data.

6. Sub downlink control channel monitoring occasion: A sub downlink control channel monitoring occasion is a downlink control channel monitoring occasion for one downlink frequency domain resource when a radio access network device configures K downlink frequency resources. A downlink control channel monitoring occasion corresponding to HARQ feedback information is a downlink control channel monitoring occasion for the K downlink frequency domain resources, where K is an integer greater than or equal to 2.

7. Downlink frequency domain resource and uplink frequency domain resource: A downlink frequency domain resource is a frequency domain resource used to transmit downlink control information, a downlink control channel, downlink data, a downlink reference signal, or the like, for example, a downlink BWP in NR. An uplink frequency domain resource is a frequency domain resource used to transmit uplink data, an uplink control channel, uplink control information, an uplink reference signal, or the like (for example, HARQ feedback information), for example, an uplink BWP in NR.

For example, a BWP includes contiguous resource blocks (RBs) in frequency domain. A network device (for example, a radio access network device) may configure a plurality of uplink BWPs and a plurality of downlink BWPs for a terminal device. In addition, a physical downlink shared channel and a physical downlink control channel can be transmitted in only the downlink BWPs, and likewise, a physical uplink shared channel and a physical uplink control channel can be transmitted in only the uplink BWPs.

8. Configuration parameter: Configuration parameters, also referred to as numerology, include parameters such as a subcarrier spacing and a cyclic prefix. For different frequency domain resources, numerology may be configured independently. A downlink BWP in an NR system is used as an example. When a downlink BWP1 corresponds to a subcarrier spacing of 15 kHz and a downlink BWP2 corresponds to a subcarrier spacing of 30 kHz, a time unit corresponding to the downlink BWP1 is different from a time unit corresponding to the downlink BWP2.

The following describes the embodiments of this application in detail with reference to the mobile communications system shown in FIG. 1, by using an example in which a time sequence relationship includes the first relationship. It should be noted that a downlink control channel monitoring occasion corresponding to HARQ feedback information may be alternatively determined based on the second relationship or the third relationship. This is not limited in the embodiments of this application. A manner of determining a quantity of downlink control channel monitoring occasions corresponding to HARQ feedback information is similar to a manner of determining, based on the first relationship, a quantity of downlink control channel monitoring occasions corresponding to HARQ feedback information. Details are not described herein again.

Figure 2:
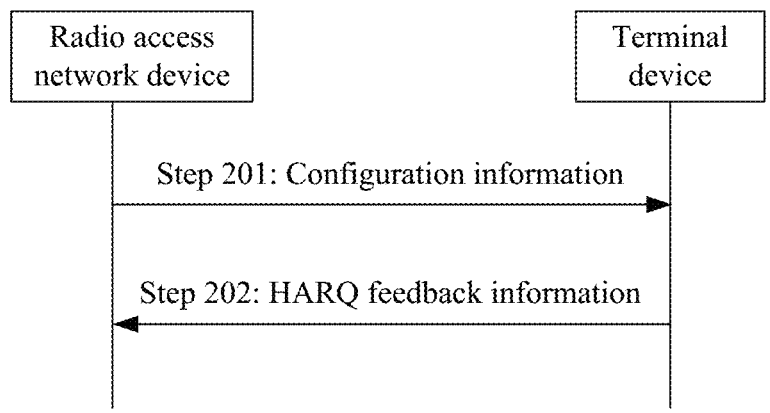
FIG. 2 is a feedback method according to an embodiment of this application.

As shown in FIG. 2, a feedback method in an embodiment of this application includes the following steps.

Step 201: A radio access network device sends configuration information to a terminal device, where the configuration information is used to indicate K time sequence relationships, the K time sequence relationships are used for HARQ feedback on K downlink frequency domain resources, the K downlink frequency domain resources are configured by the radio access network device for the terminal device, and K is a positive integer greater than or equal to 2.

For example, the radio access network device in NR is a base station, and the downlink frequency domain resources are downlink BWPs. If the base station configures a downlink BWP1 and a downlink BWP2 for the terminal device, the downlink BWP1 corresponds to a time sequence relationship 1, and the downlink BWP2 corresponds to a time sequence relationship 2. The time sequence relationship 1 may be the same as the time sequence relationship 2, or may be different from the time sequence relationship 2. This is not limited. For example, the time sequence relationship 1 includes a timing relationship 1 and a timing relationship 2, and the time sequence relationship 2 includes a timing relationship 3. The timing relationship 1 indicates a timing relationship between a time unit used to receive data and a time unit used to send HARQ feedback information of the data. The timing relationship 2 indicates a relationship between a time unit used to send downlink scheduling information of data and a time unit used to receive the data, and the downlink scheduling information is used to schedule a frequency domain resource used to transmit the data. The timing relationship 3 indicates a relationship between a time unit used to send downlink scheduling information of data and a time unit used to send HARQ feedback information of the data. For another example, the time sequence relationship 1 includes a timing relationship 4, and the time sequence relationship 2 includes the timing relationship 4. The timing relationship 4 indicates a timing relationship between a time unit used to receive data and a time unit used to send HARQ feedback information of the data.

Step 202: The terminal device receives the configuration information sent by the radio access network device, and sends HARQ feedback information to the radio access network device, where a quantity of downlink control channel monitoring occasions corresponding to the HARQ feedback information is determined based on the K time sequence relationships.

It should be noted that the HARQ feedback information in this embodiment of this application may also be a HARQ feedback codebook, and a name of the HARQ feedback information is not limited.

The following describes in detail solutions for determining, based on the K time sequence relationships, the quantity of downlink control channel monitoring occasions corresponding to the HARQ feedback information.

Solution 1

The quantity of downlink control channel monitoring occasions corresponding to the HARQ feedback information is determined based on a quantity of parameters obtained by finding a union of K parameter sets corresponding to the K time sequence relationships.

For example, the radio access network device configures a downlink frequency domain resource 1, a downlink frequency domain resource 2, and a downlink frequency domain resource 3 for the terminal device. The downlink frequency domain resource 1 corresponds to a time sequence relationship 1, the downlink frequency domain resource 2 corresponds to a time sequence relationship 2, and the downlink frequency domain resource 3 corresponds to a time sequence relationship 3. It is assumed that the time sequence relationship 1, the time sequence relationship 2, and the time sequence relationship 3 each include a timing relationship 1, and the timing relationship 1 indicates a timing relationship between a time unit used to receive data and a time unit used to send HARQ feedback information of the data. If a parameter set corresponding to the time sequence relationship 1 includes a K1 set A={1, 2}, a parameter set corresponding to the time sequence relationship 2 includes a K1 set B={2, 3, 4}, and a parameter set corresponding to the time sequence relationship 3 includes a K1 set C={4, 5}, a union of the K1 set A, the K1 set B, and the K1 set C is {1, 2, 3, 4, 5}, and a quantity of parameters in the union is 5. Therefore, a quantity of downlink control channel monitoring occasions corresponding to the HARQ feedback information is 5.

Solution 1 is applicable to a scenario in which the radio access network device configures a plurality of downlink frequency domain resources for the terminal device and activates one downlink frequency domain resource at a time. Solution 1 does not consider a case in which a configuration parameter of the downlink frequency domain resource and a configuration parameter of an uplink frequency domain resource used to send the HARQ feedback information, for example, subcarrier spacings, are different.

Further, when the configuration parameter of the downlink frequency domain resource and the configuration parameter of the uplink frequency domain resource used to send the HARQ feedback information, for example, subcarrier spacings, are different, sizes of time units corresponding to the frequency domain resources may be different because the configuration parameters of the frequency domain resources are different. Therefore, to make the radio access network device and the terminal device have a same understanding on the HARQ feedback information, an optional solution, for example, Solution 2, is proposed, to further consider a configuration parameter difference between different frequency domain resources based on Solution 1.

Solution 2

The quantity of downlink control channel monitoring occasions corresponding to the HARQ feedback information is determined based on the quantity of parameters obtained by finding the union of the K parameter sets corresponding to the K time sequence relationships, a largest subcarrier spacing in subcarrier spacings corresponding to the K downlink frequency domain resources, and a subcarrier spacing of an uplink frequency domain resource on which the HARQ feedback information is located.

For example, the quantity of downlink control channel monitoring occasions corresponding to the HARQ feedback information satisfies Expression (1):

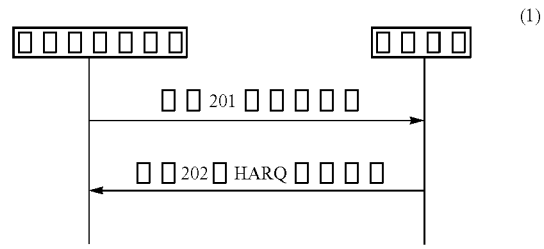

where f represents the quantity of downlink control channel monitoring occasions corresponding to the HARQ feedback information; $N$ represents the quantity of parameters obtained by finding the union of the K parameter sets corresponding to the K time sequence relationships; $W_{max}$ represents a largest subcarrier spacing in subcarrier spacings corresponding to K downlink BWPs; and $W_0$ represents a subcarrier spacing of an uplink BWP used to send the HARQ feedback information.

Figure 3:
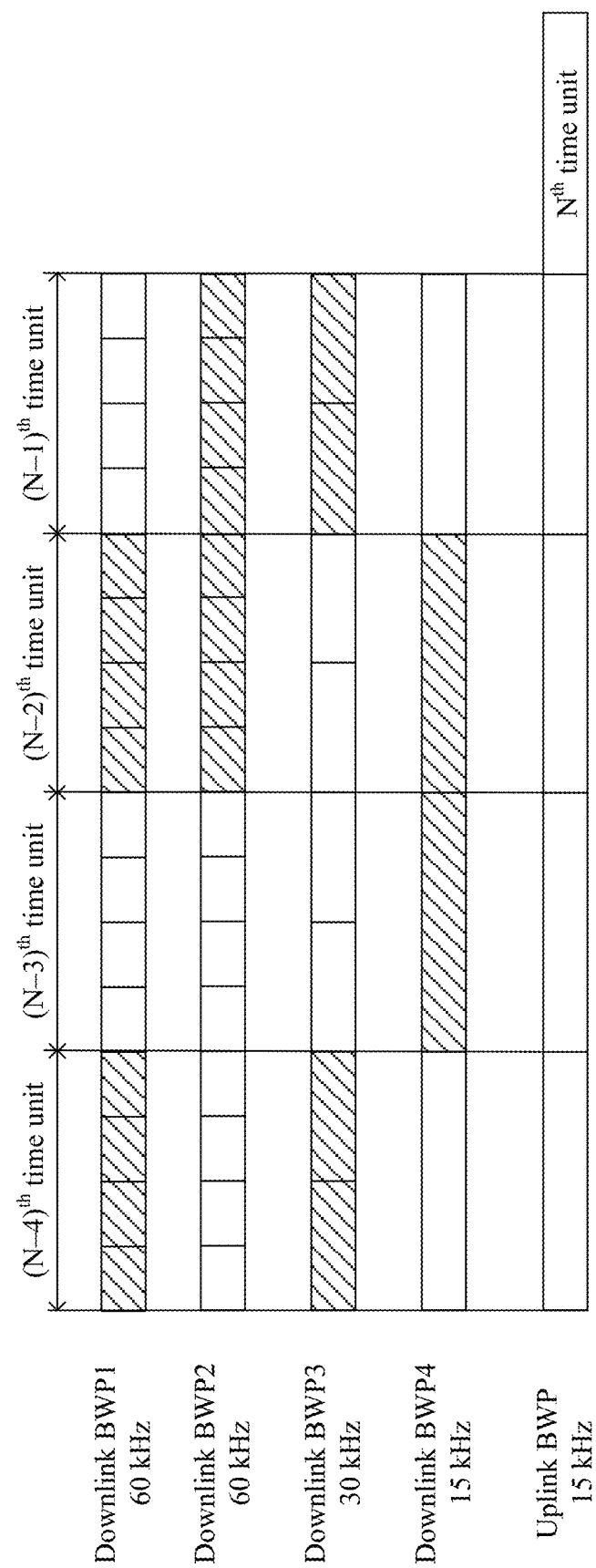
FIG. 3 is a schematic diagram of a time sequence relationship according to an embodiment of this application.

The foregoing expression satisfied by the quantity of downlink control channel monitoring occasions corresponding to the HARQ feedback information is used as an example. As shown in FIG. 3, the radio access network device in an NR system is a base station. It is assumed that the base station configures a downlink BWP1, a downlink BWP2, a downlink BWP3, and a downlink BWP4 for the terminal device. The downlink BWP1 corresponds to a subcarrier spacing of 60 kHz, the downlink BWP2 corresponds to a subcarrier spacing of 60 kHz, the downlink BWP3 corresponds to a subcarrier spacing of 30 kHz, a downlink BWP corresponds to a subcarrier spacing of 15 kHz, and an uplink BWP4 corresponds to a subcarrier spacing of 15 kHz. The uplink BWP is a frequency domain resource used to send the HARQ feedback information. If a parameter set 1 is {2, 4}, a parameter set 2 is {1, 2}, a parameter set 3 is {1, 4}, and a parameter set 4 is {2, 3}, where the parameter set 1 corresponds to a time sequence relationship corresponding to the downlink BWP1, the parameter set 2 corresponds to a time sequence relationship corresponding to the downlink BWP2, the parameter set 3 corresponds to a time sequence relationship corresponding to the downlink BWP3, and the parameter set 4 corresponds to a time sequence relationship corresponding to the downlink BWP4, a parameter set obtained by finding a union of the parameter set 1, the parameter set 2, the parameter set 3, and the parameter set 4 is {1, 2, 3, 4}. A quantity N of parameters in the set {1, 2, 3, 4} is 4, a largest subcarrier spacing $W_{max}$ in the subcarrier spacings corresponding to the downlink BWP1, the downlink BWP2, the downlink BWP3, and the downlink BWP4 is 60 kHz, and a subcarrier spacing $W_0$ corresponding to the uplink BWP is 15 kHz. The obtained values of N, $W_{max}$, and $W_0$ are substituted into Expression (1), and the quantity of downlink control channel monitoring occasions corresponding to the HARQ feedback information is obtained, that is, 4×(60/15)=16.

It should be noted that Solution 2 can be applied to a scenario in which the radio access network device configures a plurality of downlink frequency domain resources for the terminal device, can configure a configuration parameter of each frequency domain resource separately, and activates only one downlink frequency domain resource at a time.

In addition, Solution 2 can also be applied to a scenario in which the radio access network device configures one downlink frequency domain resource for the terminal device and can configure a configuration parameter of the downlink frequency domain resource and a configuration parameter of the uplink frequency domain resource separately.

For example, the radio access network device in an NR system is a base station. It is assumed that the base station configures a downlink BWP1 for the terminal device. The downlink BWP1 corresponds to a subcarrier spacing of 60 kHz, and an uplink BWP corresponds to a subcarrier spacing of 15 kHz. The uplink BWP is a frequency domain resource used to send the HARQ feedback information. If a parameter set 1 is {2, 4}, and the parameter set 1 corresponds to a time sequence relationship corresponding to the downlink BWP1, a parameter set obtained by finding a union of the parameter set 1 is still the parameter set 1. In this case, because the base station configures only one downlink BWP for the terminal device and the downlink BWP corresponds to one parameter set, a step of finding the union of the parameter set may be omitted. A quantity of parameters in the set {2, 4} is 2, the subcarrier spacing corresponding to the downlink BWP1 is 60 kHz, and the subcarrier spacing corresponding to the uplink BWP is 15 kHz. Therefore, N is 2, $W_{max}$ is 60 kHz, and $W_0$ is 15 kHz. The obtained values of N, $W_{max}$, and $W_0$ are substituted into Expression (1), and the quantity of downlink control channel monitoring occasions corresponding to the HARQ feedback information is obtained, that is, 2×(60/15)=8.

Solution 3

The quantity of downlink control channel monitoring occasions corresponding to the HARQ feedback information is determined based on a sum of K quantities of sub downlink control channel monitoring occasions, and the K sub downlink control channel monitoring occasions are determined based on a quantity of parameters in K parameter sets corresponding to the K time sequence relationships.

Specifically, in this embodiment of this application, the K sub downlink control channel monitoring occasions may be determined based on the K parameter sets corresponding to the K time sequence relationships, in the following manners:

Manner A: For each of the K sub downlink control channel monitoring occasions, a quantity of sub downlink control channel monitoring occasions is determined based on a parameter set corresponding to a time sequence relationship corresponding to a downlink frequency domain resource corresponding to the sub downlink control channel monitoring occasion.

For example, the radio access network device configures a downlink frequency domain resource 1 and a downlink frequency domain resource 2 for the terminal device. A time sequence relationship 1 corresponds to the downlink frequency domain resource 1, a time sequence relationship 2 corresponds to the downlink frequency domain resource 2, a parameter set 1 corresponds to the time sequence relationship 1, and a parameter set 2 corresponds to the time sequence relationship 2. Therefore, a quantity of sub downlink control channel monitoring occasions corresponding to the downlink frequency domain resource 1 is determined based on the parameter set 1, and a quantity of sub downlink control channel monitoring occasions corresponding to the downlink frequency domain resource 2 is determined based on the parameter set 2. For example, if the parameter set 1={3, 4, 5} and the parameter set 2={2, 5, 7, 8}, the quantity of sub downlink control channel monitoring occasions corresponding to the downlink frequency domain resource 1 is a quantity of parameters included in the parameter set 1, and the quantity of sub downlink control channel monitoring occasions corresponding to the downlink frequency domain resource 2 is a quantity of parameters included in the parameter set 2.

Optionally, in this embodiment of this application, an optional manner of calculating the quantity of parameters included in the parameter set 1 is that the quantity of parameters included in the parameter set 1 is 3, a quantity of parameters actually included in the parameter set 1. Similarly, in this calculation manner, the quantity of parameters included in the parameter set 2 {2, 5, 7, 8} is 4, a quantity of parameters actually included in the parameter set 2. Alternatively, another optional manner of calculating the quantity of parameters included in the parameter set 1 is adding 1 to a difference between a largest parameter value and a smallest parameter value in the parameter set 1. In this case, the quantity of parameters included in the parameter set 1 is (5−3+1)=3. Similarly, in this calculation manner, the quantity of parameters included in the parameter set 2 {2, 5, 7, 8} is (8−2+1)=7.

When Manner A is used to determine the quantity of the sub downlink control channel monitoring occasions in Solution 3 for determining the quantity of downlink control channel monitoring occasions corresponding to the HARQ feedback information, Solution 3 is applicable to a scenario in which the radio access network device configures a plurality of downlink frequency domain resources for the terminal device and activates only one or more downlink frequency domain resources at a time. However, when the quantity of sub downlink control channel monitoring occasions is determined in Manner 1, no consideration is given to a case in which a configuration parameter of the downlink frequency domain resource and a configuration parameter of the uplink frequency domain resource used to send the HARQ feedback information, for example, subcarrier spacings, are different.

Further, when the configuration parameter of the downlink frequency domain resource and the configuration parameter of the uplink frequency domain resource used to send the HARQ feedback information, for example, subcarrier spacings, are different, sizes of time units corresponding to the frequency domain resources may be different because the configuration parameters of the frequency domain resources are different. To make the radio access network device and the terminal device have a same understanding on the HARQ feedback information, an optional manner, for example, Manner B, of determining the quantity of sub downlink control channel monitoring occasions is proposed. In Manner B, based on Manner A, a configuration parameter difference between different frequency domain resources are further considered, to determine the quantity of sub downlink control channel monitoring occasions.

Manner B: A sub downlink control channel monitoring occasion corresponds to a downlink frequency domain resource. In this case, for each of the K sub downlink control channel monitoring occasions, a quantity of sub downlink control channel monitoring occasions is determined based on a parameter set corresponding to a time sequence relationship corresponding to a downlink frequency domain resource corresponding to the sub downlink control channel monitoring occasion, a subcarrier spacing corresponding to the downlink frequency domain resource, and a subcarrier spacing corresponding to an uplink frequency domain resource used to send the HARQ feedback information.

For example, the quantity of sub downlink control channel monitoring occasions corresponding to the downlink frequency domain resource satisfies Expression (2):

$$Y = N_0 \times \frac{W_1}{W_0} \quad (2)$$

where Y represents the quantity of sub downlink control channel monitoring occasions corresponding to the downlink frequency domain resource; $N_0$ represents a quantity of parameters in the parameter set corresponding to the time sequence relationship corresponding to the downlink frequency domain resource; and $W_1$ represents the subcarrier spacing corresponding to the downlink frequency domain resource; and $W_0$ represents the subcarrier spacing corresponding to the uplink frequency domain resource used to send the HARQ feedback information.

It should be noted that a manner of calculating the quantity of parameters in the parameter set corresponding to the time sequence relationship corresponding to the downlink frequency domain resource is similar to the manner of calculating the quantity of parameters in the parameter set 1 in Manner A. Details are not described herein again.

That the quantity of parameters in the parameter set corresponding to the time sequence relationship corresponding to the downlink frequency domain resource is a quantity of parameters actually included in the parameter set is used as an example. For example, as shown in FIG. 3, the radio access network device in an NR system is a base station. It is assumed that the base station configures a downlink BWP1, a downlink BWP2, a downlink BWP3, and a downlink BWP4 for the terminal device. The downlink BWP1 corresponds to a subcarrier spacing of 60 kHz, the downlink BWP2 corresponds to a subcarrier spacing of 60 kHz, the downlink BWP3 corresponds to a subcarrier spacing of 30 kHz, the downlink BWP4 corresponds to a subcarrier spacing of 15 kHz, and an uplink BWP corresponds to a subcarrier spacing of 15 kHz. The uplink BWP is a frequency domain resource used to send the HARQ feedback information. If a parameter set 1 is {2, 4}, a parameter set 2 is {1, 2}, a parameter set 3 is {1, 4}, and a parameter set 4 is {2, 3}, where the parameter set 1 corresponds to a time sequence relationship corresponding to the downlink BWP1, the parameter set 2 corresponds to a time sequence relationship corresponding to the downlink BWP2, the parameter set 3 corresponds to a time sequence relationship corresponding to the downlink BWP3, and the parameter set 4 corresponds to a time sequence relationship corresponding to the downlink BWP4, for a quantity of sub downlink control channel monitoring occasions corresponding to the downlink BWP1, $N_0=2$, $W_1=60$ kHz, and $W_0=15$ kHz. Then, $N_0=2$, $W_1=60$ kHz, and $W_0=15$ kHz are substituted into Expression (2) to obtain the quantity of sub downlink control channel monitoring occasions corresponding to the downlink BWP1, that is, 8. Similarly, a quantity of sub downlink control channel monitoring occasions corresponding to the downlink BWP2 is 8, a quantity of sub downlink control channel monitoring occasions corresponding to the BWP3 is 4, and a quantity of sub downlink control channel monitoring occasions corresponding to the downlink BWP4 is 2. Therefore, the quantity of downlink control channel monitoring occasions corresponding to the HARQ feedback information is (8+8+4+2)=22.

It should be noted that when Manner B is used to determine the quantity of the sub downlink control channel monitoring occasions in Solution 3 for determining the quantity of the downlink control channel monitoring occasions corresponding to the HARQ feedback information, Solution 3 is applicable to a scenario in which the radio access network device configures a plurality of downlink frequency domain resources for the terminal device, can configure a configuration parameter of each frequency domain resource separately, and activates only one or more downlink frequency domain resources at a time.

Manner C: Each of the K quantities of sub downlink control channel monitoring occasions is determined based on a largest subcarrier spacing in subcarrier spacings corresponding to the K downlink frequency domain resources, and a subcarrier spacing of an uplink frequency domain resource on which the HARQ feedback information is located.

During specific implementation, the sub downlink control channel monitoring occasion corresponds to a first time unit, and duration of the first time unit is duration of a time unit corresponding to the uplink frequency domain resource used to send the HARQ feedback information. In this case, for each of the K sub downlink control channel monitoring occasions, a quantity of sub downlink control channel monitoring occasions is determined as follows: A downlink frequency domain resource that is in the K downlink frequency domain resources and that can be used to transmit data in the first time unit corresponding to the sub downlink control channel monitoring occasion is determined based on parameter sets corresponding to the time sequence relationships corresponding to the K downlink frequency domain resources, and then the quantity of sub downlink control channel monitoring occasions corresponding to the first time unit is determined based on a ratio of a largest subcarrier spacing in subcarrier spacings corresponding to the determined downlink frequency domain resource, to the subcarrier spacing of the uplink frequency domain resource used to send the HARQ feedback information. In particular, if the K downlink frequency domain resources include no downlink frequency domain resource that can be used to transmit data in the first time unit corresponding to the sub downlink control channel monitoring occasion, the quantity of sub downlink control channel monitoring occasions is 0.

It should be noted that when the subcarrier spacing corresponding to the downlink frequency domain resource configured by the radio access network device for the terminal device is the same as the subcarrier spacing corresponding to the uplink frequency domain resource used to send the HARQ feedback information, the duration of the first time unit can also be duration corresponding to the downlink frequency domain resource. In this case, if the K downlink frequency domain resources include a downlink frequency domain resource that can be used to transmit data in the first time unit, the quantity of sub downlink control channel monitoring occasions corresponding to the first time unit is 1. When the subcarrier spacing corresponding to the downlink frequency domain resource configured by the radio access network device for the terminal device is different from the subcarrier spacing corresponding to the uplink frequency domain resource used to send the HARQ feedback information, the first time unit is set to the duration of the time unit corresponding to the uplink frequency domain resource used to send the HARQ feedback information, to make the radio access network device and the terminal device have a same understanding on the first time unit. The foregoing setting manner of the first time unit is applied to a case in which the subcarrier spacing corresponding to the uplink frequency domain resource used to send the HARQ feedback information is not greater than the subcarrier spacing corresponding to the downlink frequency domain resource.

For example, as shown in FIG. 3, the radio access network device in an NR system is a base station. It is assumed that the base station configures a downlink BWP1, a downlink BWP2, a downlink BWP3, and a downlink BWP4 for the terminal device. The downlink BWP1 corresponds to a subcarrier spacing of 60 kHz, the downlink BWP2 corresponds to a subcarrier spacing of 60 kHz, the downlink BWP3 corresponds to a subcarrier spacing of 30 kHz, the downlink BWP4 corresponds to a subcarrier spacing of 15 kHz, and an uplink BWP corresponds to a subcarrier spacing of 15 kHz. The uplink BWP is a frequency domain resource used to send the HARQ feedback information. If a parameter set 1 is {2, 4}, a parameter set 2 is {1, 2}, a parameter set 3 is {1, 4}, and a parameter set 4 is {2, 3}, where the parameter set 1 corresponds to a time sequence relationship corresponding to the downlink BWP1, the parameter set 2 corresponds to a time sequence relationship corresponding to the downlink BWP2, the parameter set 3 corresponds to a time sequence relationship corresponding to the downlink BWP3, and the parameter set 4 corresponds to a time sequence relationship corresponding to the downlink BWP4, for the $(N-4)^{th}$ time unit, it can be learned from the parameter set 1, the parameter set 2, the parameter set 3, and the parameter set 4 that downlink BWPs, in the downlink BWP1, the downlink BWP2, the downlink BWP3, and the downlink BWP4, that can be used to transmit data in the $(N-4)^{th}$ time unit include the downlink BWP1 and the downlink BWP3 (shaded portions in the figure correspond to BWPs that can be used to transmit data). The subcarrier spacing corresponding to the downlink BWP1 is 60 kHz, and the subcarrier spacing corresponding to the downlink BWP3 is 30 kHz. Therefore, a largest subcarrier spacing in the subcarrier spacings corresponding to the downlink BWP1 and the downlink BWP3 is 60 kHz. Because the subcarrier spacing corresponding to the uplink BWP used to transmit the HARQ feedback information is 15 kHz, a quantity of sub downlink control channel monitoring occasions corresponding to the $(N-4)^{th}$ time unit is 60 kHz/15 kHz=4. Similarly, a quantity of sub downlink control channel monitoring occasions corresponding to the $(N-3)^{th}$ time unit is 1, a quantity of sub downlink control channel monitoring occasions corresponding to the $(N-2)^{th}$ time unit is 4, and a quantity of sub downlink control channel monitoring occasions corresponding to the $(N-1)^{th}$ time unit is 4. Therefore, the quantity of downlink control channel monitoring occasions corresponding to the HARQ feedback information is (4+1+4+4)=13.

It should be noted that when Manner C is used to determine the quantity of sub downlink control channel monitoring occasions in Solution 3 for determining the quantity of downlink control channel monitoring occasions corresponding to the HARQ feedback information, Solution 3 is applicable to a scenario in which the radio access network device configures a plurality of downlink frequency domain resources for the terminal device, can configure a configuration parameter of each frequency domain resource separately, and activates only one downlink frequency domain resource at a time.

In addition, none of the manners of determining the quantity of downlink control channel monitoring occasions corresponding to the HARQ feedback information in Solution 1, Solution 2, and Solution 3 considers impact of a downlink control channel monitoring period on the downlink control channel monitoring occasion. To be specific, the forgoing describes by using the downlink control channel monitoring period is set to 1, and when the downlink control channel monitoring period is N, where N is a positive integer greater than 1, the quantity of downlink control channel monitoring occasions corresponding to the HARQ feedback information is a ratio of the quantity determined in Solution 1, Solution 2, or Solution 3, to the downlink control channel monitoring period N.

It should be understood that when the data (for example, a transport block TB) transmitted on the downlink frequency domain resource is divided into code block groups (CBGs), the HARQ feedback information includes CBG-based HARQ feedback information. This technical solution is applied to a scenario in which the terminal device performs feedback for each CBG when CBGs are transmitted on the downlink frequency domain resource.

It should be noted that in this embodiment of this application, the network device may send the foregoing configuration information to the terminal device in the following manners to notify the parameter set corresponding to the time sequence relationship:

Manner 1: The network device indicates, to the terminal device by using high layer signaling, the parameter set corresponding to the time sequence relationship, and optionally, indicates, by using a downlink control information index in a downlink control channel, the parameter set corresponding to the time sequence relationship. For example, the network device indicates, to the terminal device by using the high layer signaling, that the parameter set corresponding to the time sequence relationship is {1, 3, 4, and 6}. The parameter set corresponding to the time sequence relationship is indexed by bit information in downlink control information, where 00 corresponds to 1, 01 corresponds to 3, 10 corresponds to 4, and 11 corresponds to 6. When the network device sends the downlink control information to the terminal device and an indication field in the downlink control information is 00, a parameter, corresponding to the time sequence relationship, notified by the network device to the terminal device is 1. It should be understood that a size of the parameter set, corresponding to the time sequence relationship, indicated by the network device to the terminal device by using the high layer signaling and a bit size of the indication field in the downlink control information are not limited to only 4 and 2. The foregoing is merely an example.

Manner 2: During pre-configuration or higher layer signaling configuration, one table is configured for each of the K frequency domain resources, and parameters included in the table include the parameter set corresponding to the time sequence relationship. In this case, the terminal device does not need to receive the foregoing configuration information sent by the network device. In addition, the table further includes resource assignment information, so that which one in the table corresponding to the K frequency domain resources is used by the terminal device to send or receive a message is determined in a predefined manner.

For example, tables configured for K BWPs may be shown in Table 1.

TABLE 1

| Relationship | Index | |
| --- | --- | --- |
| | First relationship | Second relationship |
| 0 | 1 | 2 |
| 1 | 2 | 3 |
| 2 | 5 | 4 |
| 3 | 6 | 7 |

Then, the network device indicates the parameter set corresponding to the time sequence relationship, by notifying the terminal device of an index in Table 1. In Table 1, the time sequence relationship includes a first relationship and a second relationship. If the network device notifies the terminal device that the index is 1, this indicates that the network device notifies the terminal device that a parameter corresponding to the first relationship corresponding to the time sequence relationship is 2, and a parameter corresponding to the second relationship corresponding to the time sequence relationship is 3. It should be noted that during specific implementation, the network device notifies the terminal device of the index in the table by using downlink control information, or may notify the terminal device of the index in the table by using other signaling. This is not limited.

When a table is configured for each BWP, and different BWPs are used for the two relationships included in the time sequence relationship, a BWP for which a to-be-used table is configured needs to be determined. Optionally, it may be determined that a table of a BWP at a source end is to be used (a table of a BWP in which a downlink control channel is located is used in a case of K0, a table of a BWP in which a downlink data channel is located is used in a case of K1, and a table of a BWP in which a downlink control channel is located is used in a case of K2; in this way, a BWP whose table is to be used is defined, so that the radio access network device and the terminal device can have a unified understanding on a parameter such as a time sequence relationship in the table, and overheads of indication bits can be reduced by predefining the relationship), or a time sequence relationship table at a destination end is to be used (a time sequence relationship table of a BWP in which a downlink data channel is located is used in a case of K0, a time sequence relationship table of a BWP in which a feedback channel is located is used in a case of K1, and a time sequence relationship table of a BWP in which an uplink data channel is located is used in a case of K2; in this way, a BWP whose table is to be used is defined, so that the radio access network device and the terminal device can have a unified understanding on a parameter such as a time sequence relationship in the table, and overheads of indication bits can be reduced by predefining the relationship), or a time sequence relationship table of a control channel is to be used, or a time sequence relationship table of a data channel is to be used. In this way, a BWP whose table is to be used is defined, so that the radio access network device and the terminal device can have a unified understanding on a parameter such as a time sequence relationship in the table, and overheads of indication bits can be reduced by predefining the relationship. Alternatively, a table of a BWP corresponding to a BWP index indicated in DCI is used, and the BWP index is used in the prior art to indicate which BWP is a currently scheduled BWP. In this way, the BWP index value can be reused without introducing additional indication overheads, thereby reducing DCI overheads.

It should be noted that, if the network device configures a downlink frequency domain resource 1 and a downlink frequency domain resource 2 for the terminal device, when a configuration parameter (such as a subcarrier spacing) corresponding to the downlink frequency domain resource 1 is different from a configuration parameter corresponding to the downlink frequency domain resource 2, to ensure that the network device and the terminal device have a same understanding on duration of a time window in HARQ feedback, optionally, for the duration of the time window in HARQ feedback, the terminal device may predefine duration or use duration corresponding to a target subcarrier spacing. For example, the target subcarrier spacing is a subcarrier spacing corresponding to the uplink frequency domain resource used by the terminal device to send the HARQ feedback information, or may be a predefined subcarrier spacing. For example, when the time sequence relationship includes only the first relationship, the target subcarrier spacing is the subcarrier spacing corresponding to the downlink frequency domain resource 1; when the time sequence relationship includes only the second relationship, the target subcarrier spacing is the subcarrier spacing corresponding to the uplink frequency domain resource used to send the HARQ feedback information.

The time window means that when the terminal device needs to send, to the network device in the $N^{th}$ time unit, feedback information of data that is in the $(N-3)^{th}$ time unit, the $(N-3)^{th}$ time unit is a feedback window. Specifically, the $N^{th}$ time unit corresponds to the subcarrier spacing corresponding to the uplink frequency domain resource used to send the HARQ feedback information.

Another embodiment of this application provides a technical solution for time domain resource assignment and/or time sequence indication. In an implementation, this embodiment may be independent of any of the foregoing embodiments.

An NR system is used as an example. One table is configured for each BWP. In a possible manner, each row in the table corresponds to one K0 value, and/or one K2 value, and/or one K1 value. In addition, each row may further include other information such as one piece of time domain resource assignment information (optionally, the time domain resource assignment information may be in a form of RIV). In this way, a network device notifies, by using DCI, a terminal device of which row is currently scheduled. After receiving the DCI, the terminal device can read a time sequence value and/or time domain resource assignment information in the corresponding row in the table.

BWPs in which a control channel (such as a PDCCH) and a data channel (such as a physical downlink shared channel (PDSCH) or (physical uplink shared channel (PUSCH)) are located may be the same or be different, and therefore the terminal needs to determine a BWP to which a to-be-used table corresponds. Optionally, it may be predetermined that a table corresponding to a BWP in which a downlink control channel is located is to be used, or a table corresponding to a BWP in which a data channel (PDSCH or PUSCH) is located is to be used. In this way, a BWP to which a to-be-used table corresponds is predefined, so that a radio access network device and the terminal device can have a unified understanding on a parameter such as a time sequence relationship in the table, and overheads of indication bits can be reduced by predefining the relationship. Alternatively, a table corresponding to a BWP corresponding to a BWP index indicated in DCI is used. The BWP index is used in the prior art to indicate which BWP is a currently scheduled BWP. In this way, the BWP index value can be reused without introducing additional indication overheads, thereby reducing DCI overheads.

In an implementation, if the DCI is sent in a slot x, the PDSCH is sent in a slot x+k0; if the DCI is sent in a slot x, the PUSCH is sent in a slot x+k2; if the PDSCH is sent in a slot x, the PUCCH is sent in a slot x+k1.

Still another embodiment of this application further provides a technical solution for selecting a BWP used for sending or receiving data. In an implementation, this embodiment may be independent of any of the foregoing embodiments.

Downlink control information may include two types of DCI formats for scheduling, namely, first-type DCI and second-type DCI. In this application, the first-type DCI is usually used during uplink or downlink scheduling (that is, non-fallback DCI, such as a DCI format 1_1 and a DCI format 0_1 in an existing NR protocol), and the second-type DCI is fallback DCI (for example, a DCI format 1_0 and a DCI format 0_0 in the existing NR protocol). Optionally, the fallback DCI may be used during radio resource control RRC reconfiguration. In this case, there is a specific ambiguity period for an RRC configuration message between a radio access network device and a terminal device. During scheduling, a BWP in which a scheduled data channel is carried needs to be determined. When the first-type DCI is used for scheduling, there is BWP index indication information in the first-type DCI, and a BWP index carried on an uplink data channel or a downlink data channel can be obtained by using the indication information. However, when the second-type DCI is used for scheduling, there is no BWP indication information in the second-type DCI, and therefore, a BWP carried on an uplink data channel or a downlink data channel needs to be defined. Optionally, the BWP carried on the uplink data channel or the downlink data channel may be configured by using signaling or a message. The signaling or message may be remaining minimum system information (remaining minimum system information, RMSI), or one of or a combination of more than one of an msg3 message in a random access process, a system information block (SIB), a master information block (MIB), or an RRC message. If a plurality of such signaling or messages are used to indicate the BWP carried on the uplink data channel or the downlink data channel, priorities of the plurality of such signaling or messages may be predefined, and a BWP index configured by using higher-priority signaling or a higher-priority message may rewrite or cover a BWP index configured by using lower-priority signaling or a lower-priority message. Optionally, a BWP used for the uplink data channel or the downlink data channel may be implicitly indicated by binding a BWP relationship between different channels, for example, it may be determined that an index of a BWP used for the downlink data channel is the same as an index of a BWP carrying RMSI, an msg2 in a random access process, an msg4 in a random access process, an SIB message, an MIB message, a synchronization signal, a downlink control channel, or a previous or last downlink data channel. Alternatively, a system pre-configured default downlink BWP or an initial activated downlink BWP may be used to perform downlink data channel transmission. For uplink data channel transmission, it may be determined that an index of a BWP used for the uplink data channel is the same as an index of a BWP carrying an msg1 in a random access process or an msg3 in a random access process, or a pre-configured and/or defined (by a system or a carrier or a cell or UE) default uplink BWP or an initial activated uplink BWP may be used to perform uplink data channel transmission.

Yet another embodiment of this application further provides a technical solution for determining a DCI payload size (DCI payload size). In an implementation, this embodiment may be independent of any of the foregoing embodiments.

Downlink control information includes two types of DCI formats for scheduling, namely, first-type DCI and second-type DCI. In this application, the first-type DCI is DCI usually used during uplink or downlink scheduling (that is, non-fallback DCI, such as a DCI format 0_1 and a DCI format 1_1 in an existing NR protocol), and the second-type DCI is fallback DCI (for example, a DCI format 0_0 and a DCI format 1_0 in the existing NR protocol). The fallback DCI is mainly used during RRC reconfiguration. In this case, there is a specific ambiguity period for an RRC configuration message between a wireless network access device and a terminal device. There is frequency domain resource assignment (Frequency domain resource assignment) information in the second-type DCI, and a quantity of bits occupied by the frequency domain resource assignment information is determined based on a formula $\lceil \log_2(N_{RB}^{UL,BWP}(N_{RB}^{UL,BWP}+1)/2) \rceil$ or $\lceil \log_2(N_{RB}^{DL,BWP}(N_{RB}^{DL,BWP}+1)/2) \rceil$, which corresponds to uplink or downlink. $N_{RB}^{UL,BWP}$ is a quantity of RBs in an uplink carrier BWP, and $N_{RB}^{DL,BWP}$ is a quantity of RBs in a downlink carrier BWP. However, there is no BWP index indication field in the second-type DCI, and a quantity of bits of the DCI or a quantity of bits occupied by a frequency domain resource assignment field in the DCI needs to be determined based on the quantity of RBs in the BWP used for downlink or uplink. To reduce blind detection overheads of the DCI, the quantity of bits occupied by the frequency domain resource assignment field in the second-type DCI needs to be determined.

Optionally, for the second-type DCI in downlink, during calculation of the quantity of bits occupied by the frequency domain resource assignment field, an optional manner is to define that an index/a bandwidth size/a quantity of RBs of a BWP used for a downlink data channel is the same as an index/a bandwidth size/a quantity of RBs of a BWP carrying RMSI, an msg2 in a random access process, an msg4 in a random access process, an SIB message, an MIB message, a synchronization signal, a downlink control channel, or a previous or last downlink data channel. In other words, the quantity of RBs in the BWP carrying the RMSI, the msg2 in the random access process, the msg4 in the random access process, the SIB message, the MIB message, the synchronization signal, the downlink control channel, or the previous or last downlink data channel is used to determine the quantity of bits occupied by the frequency domain resource assignment information or a DCI size.

In another optional manner, a pre-configured and/or defined (by a system or a carrier or a cell or UE) default downlink BWP or a pre-configured and/or defined (by a system or a carrier or a cell or UE) initial activated BWP is used for downlink data channel transmission. In other words, a quantity of RBs corresponding to the pre-configured and/or defined (by the system or the carrier or the cell or the UE) default downlink BWP or the pre-configured and/or defined (by the system or the carrier or the cell or the UE) initial activated BWP is used to determine a quantity of bits occupied by the frequency domain resource assignment information. Alternatively, a quantity of RBs in a BWP that has a largest or smallest bandwidth and/or a largest or smallest quantity of RBs and that is in all configured downlink BWPs, or a maximum and/or minimum downlink bandwidth and/or a maximum and/or minimum quantity of RBs supported by the terminal device, or a maximum and/or minimum downlink bandwidth and/or a maximum and/or minimum quantity of RBs supported by a network, or a maximum and/or minimum downlink bandwidth and/or a maximum and/or minimum quantity of RBs supported by a protocol are/is used to determine a quantity of bits occupied by the frequency domain resource assignment information or a DCI size.

In another optional manner, for the second-type DCI in uplink, during calculation of the frequency domain resource assignment field, it is determined that an index and/or a bandwidth size and/or a quantity of RBs of a BWP used for an uplink data channel are/is the same as an index and/or a bandwidth size and/or a quantity of RBs of a BWP carrying an msg1 in a random access process or an msg3 in a random access process. In other words, the quantity of RBs in the BWP carrying the msg1 in the random access process or the msg3 in the random access process is used to determine the quantity of bits occupied by the frequency domain resource assignment information or a DCI size.

In another optional manner, a pre-configured and/or defined (by a system or a carrier or a cell or UE) default uplink BWP or an initial activated uplink BWP is used to perform uplink data channel transmission. In other words, a quantity of RBs corresponding to the pre-configured and/or defined (by the system or the carrier or the cell or the UE) default uplink BWP or the initial activated uplink BWP is used to determine a quantity of bits occupied by the frequency domain resource assignment information; or a quantity of RBs in a BWP with a largest bandwidth in all configured uplink BWPs, or a maximum and/or minimum uplink bandwidth and/or a maximum and/or minimum quantity of RBs supported by the UE, or a maximum and/or minimum uplink bandwidth supported by a network, or a maximum quantity of RBs corresponding to a maximum and/or minimum uplink bandwidth supported by a protocol are/is used to determine a quantity of bits occupied by the frequency domain resource assignment information or a DCI size. The DCI size in the uplink scheduling or in the downlink scheduling or a size of the frequency domain resource assignment field or the quantity of bits occupied by the frequency domain resource assignment information in the DCI can be determined by using the foregoing method. In this way, the quantity of bits of the DCI can be kept fixed, thereby reducing blind detection overheads of the DCI.

In the foregoing solution, if the DCI size or the quantity of bits of the frequency domain resource assignment information field is greater than an actually required quantity of bits, an extra bit may be used to fill in a default value; or if the DCI size or the quantity of bits of the frequency domain resource assignment information field is less than an actually required quantity of bits, a scheduling status of only some of resources that can be indicated may be indicated (for example, there are only 10 bits, and a scheduling status of only first 10 RBs is indicated). The present invention does not impose any limitation.

In addition, it should also be noted that at least two embodiments in this application may be used in combination to form a complete embodiment.

In the foregoing embodiments provided in this application, the method provided in the embodiments of this application is described from perspectives of the radio access network device, the terminal device, and interaction between the radio access network device and the terminal device. To implement the functions in the foregoing method provided in the embodiments of this application, the base station and the terminal device may include a hardware structure and/or a software module, and implement the foregoing functions in a form of the hardware structure, the software module, or a combination of the hardware structure and the software module. Whether one of the foregoing functions is performed in the form of the hardware structure, the software module, or the combination of the hardware structure and the software module depends on a specific application and a design constraint of the technical solution.

Figure 4:
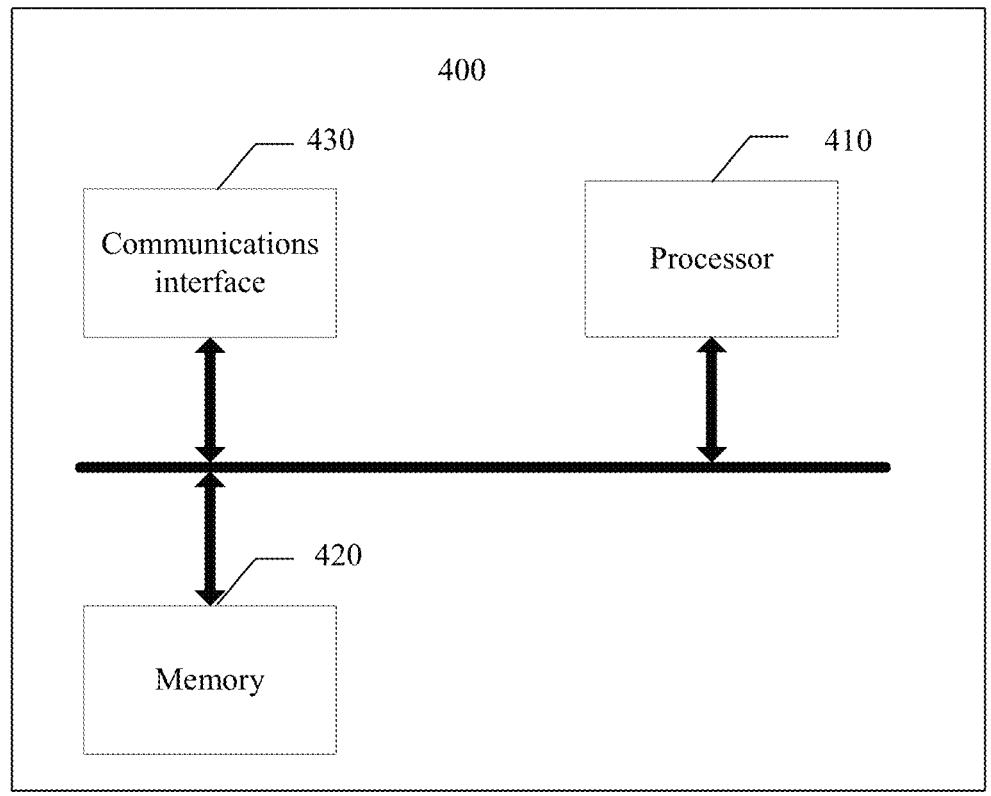
FIG. 4 is a schematic structural diagram of an apparatus according to an embodiment of this application.

Based on a same idea, FIG. 4 shows an apparatus 400 provided in this application. The apparatus 400 may be a terminal device, or may be a device that can support a terminal device in implementing the functions of the terminal device in the method shown in FIG. 2. For example, the apparatus 400 may also be an apparatus (for example, a chip or a chip system) in the terminal device. It should be noted that, in this embodiment of this application, the chip system may include a chip, or may include a chip and another discrete component.

The apparatus 400 includes at least one processor 410, configured to implement the functions of the terminal device in the feedback method provided in the embodiments of this application.

The apparatus 400 may further include at least one memory 420, configured to store a program instruction and/or data. The memory 420 is coupled to the processor 410. The coupling in this embodiment of this application is an indirect coupling or communication connection between apparatuses, units, or modules, may be in an electrical form, a mechanical form, or another form, and is used for information exchange between the apparatuses, units, or modules. The processor 410 may perform an operation in cooperation with the memory 420. The processor 410 may execute the program instruction stored in the memory 420. At least one of the at least one memory 420 may be included in the processor 410.

The apparatus 400 may further include a communications interface 430. The apparatus 400 may exchange information with another device by using the communications interface 430. The communications interface 430 may be a circuit, a bus, a transceiver, or any other apparatus that can be configured to perform information exchange. For example, the another device may be another terminal device or a network device. The processor 410 can receive and transmit data by using the communications interface 430. For example, the communications interface 430 is configured to receive configuration information sent by the network device, and send HARQ feedback information to the network device.

A specific connection medium between the communications interface 430, the processor 410, and the memory 420 is not limited in this embodiment of this application. In FIG. 4, in this embodiment of this application, the memory 420, the processor 410, and the communications interface 430 are connected by using a bus. The bus is represented by a bold line in FIG. 4. This is only a schematic illustration and is not intended for limitation. There may be other connection manners between the components. The bus may be classified into an address bus, a data bus, a control bus, and the like. For ease of representation, only one thick line is used to represent the bus in FIG. 4, but this does not mean that there is only one bus or only one type of bus.

In this embodiment of this application, the processor may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in the embodiments of this application. The general-purpose processor may be a microprocessor, any conventional processor, or the like. The steps of the method disclosed with reference to the embodiments of this application may be directly performed by a hardware processor, or may be performed by using a combination of hardware in the processor and a software module.

In this embodiment of this application, the memory may be a nonvolatile memory, such as a hard disk drive (hard disk drive, HDD) or a solid-state drive (solid-state drive, SSD), or may be a volatile memory (volatile memory), such as a random access memory (random-access memory, RAM). The memory may alternatively be any other medium that can be used to carry or store desired program code in a form of an instruction or a data structure and that can be accessed by a computer. However, the memory is not limited thereto. The memory in this embodiment of this application may alternatively be a circuit or any other apparatus capable of implementing a storage function, for storing the program instruction and/or data.

Figure 5:
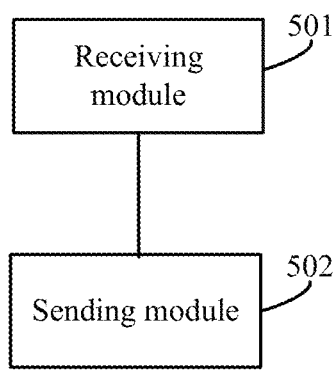
FIG. 5 is a schematic structural diagram of an apparatus according to an embodiment of this application.

FIG. 5 shows another embodiment of an apparatus provided in this application. The apparatus may be a terminal device, or may be an apparatus (such as a chip or a chip system) in a terminal device, and can implement the method performed by the terminal device in any of the foregoing embodiments shown in FIG. 2.

The apparatus includes a receiving module 501 and a sending module 502. The receiving module 501 is configured to receive configuration information sent by a network device, where the configuration information is used to indicate K time sequence relationships, the K time sequence relationships are respectively used for hybrid automatic repeat request HARQ feedback on K downlink frequency domain resources, the K downlink frequency domain resources are configured by the network device for the apparatus, and K is a positive integer greater than or equal to 2. The sending module 502 is configured to send HARQ feedback information to the network device, where a quantity of downlink control channel monitoring occasions corresponding to the HARQ feedback information is determined based on the K time sequence relationships.

In a possible design, the quantity of downlink control channel monitoring occasions corresponding to the HARQ feedback information is determined based on a quantity of parameters obtained by finding a union of K parameter sets corresponding to the K time sequence relationships.

In a possible design, the quantity of downlink control channel monitoring occasions is further determined based on a largest subcarrier spacing in subcarrier spacings corresponding to the K downlink frequency domain resources, and a subcarrier spacing of an uplink frequency domain resource on which the HARQ feedback information is located.

In a possible design, the quantity of downlink control channel monitoring occasions corresponding to the HARQ feedback information is determined based on a sum of K quantities of sub downlink control channel monitoring occasions, and the K sub downlink control channel monitoring occasions are determined based on a quantity of parameters in K parameter sets corresponding to the K time sequence relationships.

In a possible design, the K quantities of sub downlink control channel monitoring occasions are further determined based on subcarrier spacings corresponding to the K downlink frequency domain resources and a subcarrier spacing of an uplink frequency domain resource on which the HARQ feedback information is located.

In a possible design, the HARQ feedback information includes code block group CBG-based HARQ feedback information.

It should be understood that the apparatus may be configured to implement the steps performed by the terminal device in the feedback method in the embodiments of this application. For related features, refer to the foregoing descriptions. Details are not described herein again.

Figure 6:
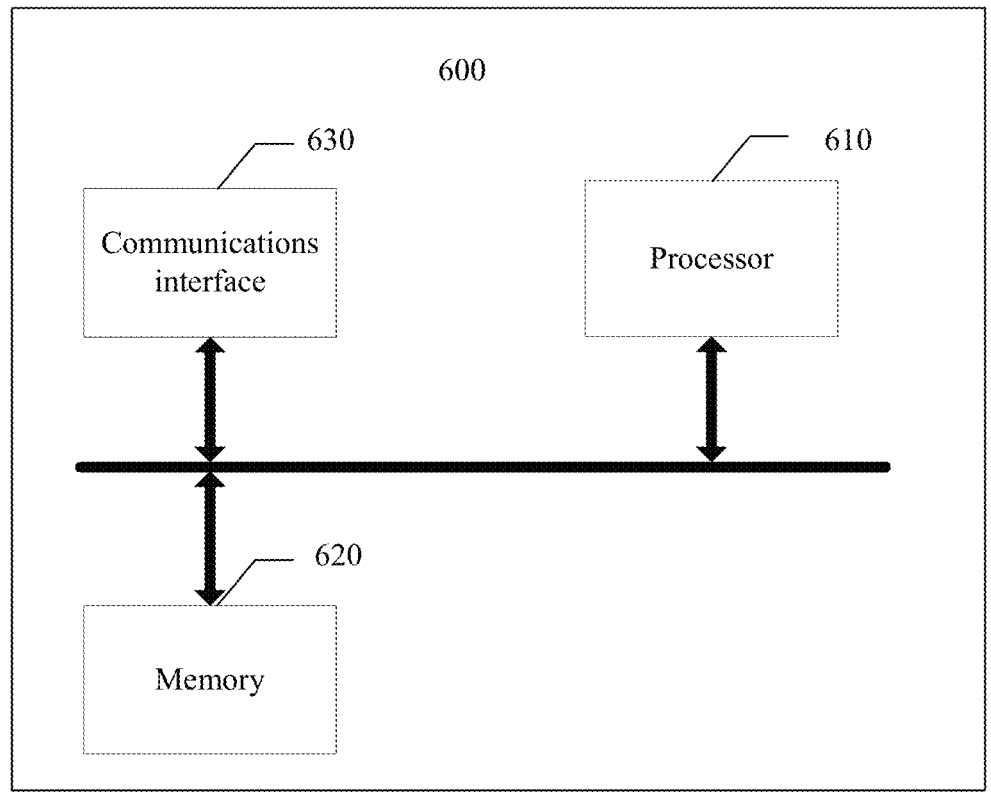
FIG. 6 is a schematic structural diagram of an apparatus according to an embodiment of this application.

Based on a same idea, FIG. 6 shows an apparatus 600 provided in this application. The apparatus 600 may be a network device, or may be an apparatus that can support a network device in implementing the functions of the radio access network device in the method shown in FIG. 2. For example, the apparatus 600 may be an apparatus (for example, a chip or a chip system) in the network device. It should be noted that, in this embodiment of this application, the chip system may include a chip, or may include a chip and another discrete component.

The apparatus 600 includes at least one processor 610, configured to implement the functions of the base station in the feedback method provided in the embodiments of this application. The apparatus 600 may further include at least one memory 620, configured to store a program instruction and/or data. The memory 620 is coupled to the processor 610. The processor 610 may perform an operation in cooperation with the memory 620. The processor 610 may execute the program instruction stored in the memory 620. At least one of the at least one memory 620 may be included in the processor 610.

The apparatus 600 may further include a communications interface 630. The apparatus 600 may exchange information with another device by using the communications interface 630. The communications interface 630 may be a circuit, a bus, a transceiver, or any other apparatus that can be configured to perform information exchange. For example, the another device may be another terminal device or a network device. The processor 610 can receive and transmit data by using the communications interface 630. For example, the communications interface 630 is configured to send configuration information to the terminal device, and receive HARQ feedback information sent by the terminal device.

A specific connection medium between the communications interface 630, the processor 610, and the memory 620 is not limited in this embodiment of this application. In FIG. 6, in this embodiment of this application, the memory 620, the processor 610, and the communications interface 630 are connected by using a bus. The bus is represented by a bold line in FIG. 6. This is only a schematic illustration and is not intended for limitation. There may be other connection manners between the components. The bus may be classified into an address bus, a data bus, a control bus, and the like. For ease of representation, only one thick line is used to represent the bus in FIG. 6, but this does not mean that there is only one bus or only one type of bus.

Figure 7:
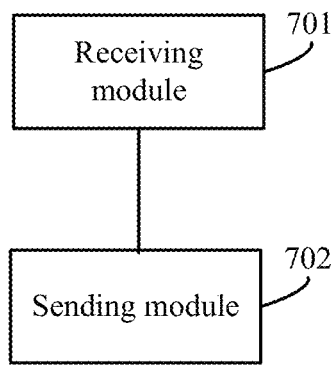
FIG. 7 is a schematic structural diagram of an apparatus according to an embodiment of this application.

FIG. 7 shows another embodiment of an apparatus provided in this application. The apparatus may be a network device or an apparatus (such as a chip or a chip system) in a network device, and can implement the method performed by the radio access network device in any of the foregoing embodiments shown in FIG. 2.

The apparatus includes a receiving module 701 and a sending module 702. The sending module 702 is configured to send configuration information to a terminal device, where the configuration information is used to indicate K time sequence relationships, the K time sequence relationships are respectively used for hybrid automatic repeat request HARQ feedback on K downlink frequency domain resources, the K downlink frequency domain resources are configured by the apparatus for the terminal device, and K is a positive integer greater than or equal to 2. The receiving module 701 is configured to receive HARQ feedback information sent by the terminal device, where a quantity of downlink control channel monitoring occasions corresponding to the HARQ feedback information is determined based on the K time sequence relationships.

In a possible design, the quantity of downlink control channel monitoring occasions corresponding to the HARQ feedback information is determined based on a quantity of parameters obtained by finding a union of K parameter sets corresponding to the K time sequence relationships.

In a possible design, the quantity of downlink control channel monitoring occasions is further determined based on a largest subcarrier spacing in subcarrier spacings corresponding to the K downlink frequency domain resources, and a subcarrier spacing of an uplink frequency domain resource on which the HARQ feedback information is located.

In a possible design, the quantity of downlink control channel monitoring occasions corresponding to the HARQ feedback information is determined based on a sum of K quantities of sub downlink control channel monitoring occasions, and the K sub downlink control channel monitoring occasions are determined based on a quantity of parameters in K parameter sets corresponding to the K time sequence relationships.

In a possible design, the K quantities of sub downlink control channel monitoring occasions are further determined based on subcarrier spacings corresponding to the K downlink frequency domain resources and a subcarrier spacing of an uplink frequency domain resource on which the HARQ feedback information is located.

In a possible design, the HARQ feedback information includes code block group CBG-based HARQ feedback information.

It should be understood that the apparatus may be configured to implement the steps performed by the radio access network device in the feedback method in the embodiments of this application. For related features, refer to the foregoing descriptions. Details are not described herein again.

Figure 8:
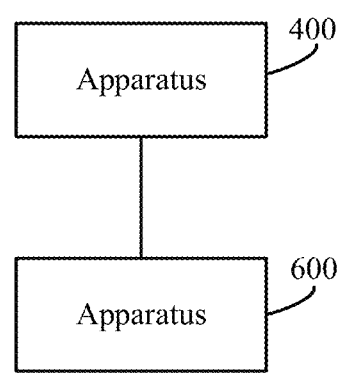
FIG. 8 is a schematic structural diagram of a communications system according to an embodiment of this application.

As shown in FIG. 8, a communications system in an embodiment of this application includes the apparatus 400 and the apparatus 600.

It should be understood that the module division in the apparatuses shown in FIG. 5 and FIG. 7 is an example and is merely logical function division. There may be another division manner in actual implementation.

All or some of the foregoing embodiments may be implemented by software, hardware, firmware, or any combination thereof. When software is used to implement the embodiments, the embodiments may be implemented completely or partially in a form of a computer program product. The computer program product includes one or more computer instructions. When the computer program instruction is loaded and executed on a computer, the procedures or functions according to the embodiments of this application are all or partially generated. The computer may be a general-purpose computer, a special-purpose computer, a computer network, a network device, a terminal device, or another programmable apparatus. The computer instruction may be stored in a computer-readable storage medium or may be transmitted from a computer-readable storage medium to another computer-readable storage medium. For example, the computer instruction may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium that can be accessed by the computer, or a data storage device, such as a server or a data center, integrating one or more usable media. The usable medium may be a magnetic medium (for example, a floppy disk, a hard disk, or a magnetic tape), an optical medium (for example, a digital video disc (digital video disc, DVD)), a semiconductor medium (for example, a solid-state drive (Solid State Disk, SSD)), or the like.

Although this application is described with reference to the embodiments, in a process of implementing this application that claims protection, a person skilled in the art may understand and implement another variation of the disclosed embodiments by viewing the accompanying drawings, disclosed content, and the appended claims. In the claims, the word "comprising" (comprising) does not exclude another component or another step, and "a" or "one" does not exclude a case of plurality. A single processor or another unit may implement one or more functions enumerated in the claims. Some measures are recorded in dependent claims that are different from each other, but this does not mean that these measures cannot be combined to produce a good effect. The term "and/or" describes an association relationship between associated objects and indicates that three relationships may exist. For example, A and/or B may indicate the following three cases: Only A exists, both A and B exist, and only B exists.

A person skilled in the art should understand that the embodiments of this application may be provided as a method, an apparatus (a device), a computer-readable storage medium, or a computer program product. Therefore, this application may use a form of hardware only embodiments, software only embodiments, or embodiments with a combination of software and hardware. They are collectively referred to as "modules" or "systems".

This application is described with reference to the flowcharts and/or block diagrams of the method, the apparatus (device), and the computer program product in this application. It should be understood that computer program instructions may be used to implement each process and/or each block in the flowcharts and/or block diagrams and a combination of processes and/or blocks in the flowcharts and/or block diagrams. These computer program instructions may be provided for a general-purpose computer, a special-purpose computer, an embedded processor, or a processor of another programmable data processing device, so that the instructions executed by the computer or the processor of any other programmable data processing device generate an apparatus for implementing a specified function in one or more processes in the flowcharts and/or in one or more blocks in the block diagrams.

These computer program instructions may be alternatively stored in a computer readable memory that can instruct a computer or another programmable data processing device to work in a specific manner, so that the instructions stored in the computer readable memory generate an artifact that includes an instruction apparatus. The instruction apparatus implements a specified function in one or more processes in the flowcharts and/or in one or more blocks in the block diagrams.

These computer program instructions may be alternatively loaded onto a computer or another programmable data processing device, so that a series of operations and steps are performed on the computer or the another programmable device, thereby generating computer-implemented processing. Therefore, the instructions executed on the computer or the another programmable device provide steps for implementing a specified function in one or more processes in the flowcharts and/or in one or more blocks in the block diagrams.

Although this application is described with reference to specific features and the embodiments thereof, apparently, various modifications and combinations may be made to them without departing from the spirit and scope of this application. Correspondingly, this specification and the accompanying drawings are merely example descriptions of this application defined by the appended claims, and are considered as covering any or all of modifications, variations, combinations or equivalents that fall within the scope of this application.

Apparently, a person skilled in the art can make various modifications and variations to this application without departing from the spirit and scope of this application. This application is intended to cover these modifications and variations of this application provided that they fall within the scope of the claims of this application and equivalent technologies thereof.

What is claimed is:

1. A method, comprising:
    receiving, by a terminal device, configuration information sent by a network device, wherein the configuration information is used to indicate K time sequence relationships, the K time sequence relationships are respectively used for hybrid automatic repeat request (HARQ) feedback on K downlink frequency domain resources, the K downlink frequency domain resources are configured by the network device for the terminal device, and K is a positive integer greater than or equal to 2; and
    sending, by the terminal device, HARQ feedback information to the network device, wherein a quantity of downlink control channel monitoring occasions corresponding to the HARQ feedback information is determined based on a total number of elements in a union of K parameter sets corresponding to the K time sequence relationships.

2. The method according to claim 1, wherein the network device is a radio access network device which configures a plurality of the K downlink frequency domain resources but activates only one of the K downlink frequency domain resources at a time.

3. The method according to claim 1, wherein the quantity of downlink control channel monitoring occasions is further determined based on a largest subcarrier spacing in subcarrier spacings corresponding to the K downlink frequency domain resources, and a subcarrier spacing of an uplink frequency domain resource on which the HARQ feedback information is located.

4. The method according to claim 1, wherein a maximum quantity of downlink control channel monitoring occasions corresponding to the HARQ feedback information is determined based on a sum of K quantities of K sub downlink control channel monitoring occasions, and the K quantities of the K sub downlink control channel monitoring occasions are determined based on a sum of K quantities of parameters in K parameter sets corresponding to the K time sequence relationships.

5. The method according to claim 4, wherein the K quantities of K sub downlink control channel monitoring occasions are further determined based on subcarrier spacings corresponding to the K downlink frequency domain resources and a subcarrier spacing of an uplink frequency domain resource on which the HARQ feedback information is located.

6. The method according to claim 1, wherein the HARQ feedback information comprises code block group CBG-based HARQ feedback information.

7. A method, comprising:
    sending, by a network device, configuration information to a terminal device, wherein the configuration information is used to indicate K time sequence relationships, the K time sequence relationships are respectively used for hybrid automatic repeat request (HARQ) feedback on K downlink frequency domain resources, the K downlink frequency domain resources are configured by the network device for the terminal device, and K is a positive integer greater than or equal to 2; and
    receiving, by the network device, HARQ feedback information sent by the terminal device, wherein a quantity of downlink control channel monitoring occasions corresponding to the HARQ feedback information is determined based on a total number of elements in a union of K parameter sets corresponding to the K time sequence relationships.

8. The method according to claim 7, wherein the network device is a radio access network device which configures a plurality of the K downlink frequency domain resources but activates only one of the K downlink frequency domain resources at a time.

9. The method according to claim 7, wherein the quantity of downlink control channel monitoring occasions is further determined based on a largest subcarrier spacing in subcarrier spacings corresponding to the K downlink frequency domain resources, and a subcarrier spacing of an uplink frequency domain resource on which the HARQ feedback information is located.

10. The method according to claim 7, wherein a maximum quantity of downlink control channel monitoring occasions corresponding to the HARQ feedback information is determined based on a sum of K quantities of K sub downlink control channel monitoring occasions, and the K quantities of the K sub downlink control channel monitoring occasions are determined based on K quantities of parameters in K parameter sets corresponding to the K time sequence relationships.

11. The method according to claim 10, wherein the K quantities of K sub downlink control channel monitoring occasions are further determined based on subcarrier spacings corresponding to the K downlink frequency domain resources and a subcarrier spacing of an uplink frequency domain resource on which the HARQ feedback information is located.

12. The method according to claim 7, wherein the HARQ feedback information comprises code block group CBG-based HARQ feedback information.

13. An apparatus, comprising:
a memory storing instructions; and
a processor coupled to the memory to execute the instructions to:
receive configuration information sent by a network device, wherein the configuration information is used to indicate K time sequence relationships, the K time sequence relationships are respectively used for hybrid automatic repeat request (HARQ) feedback on K downlink frequency domain resources, the K downlink frequency domain resources are configured by the network device for a terminal device, and K is a positive integer greater than or equal to 2; and
send HARQ feedback information to the network device, wherein a quantity of downlink control channel monitoring occasions corresponding to the HARQ feedback information is determined based on a total number of elements in a union of K parameter sets corresponding to the K time sequence relationships.

14. The apparatus according to claim 13, wherein the network device is a radio access network device which configures a plurality of the K downlink frequency domain resources but activates only one of the K downlink frequency domain resources at a time quantity of downlink control channel monitoring occasions corresponding to the HARQ feedback information is determined based on a quantity of parameters obtained by finding a union of K parameter sets corresponding to the K time sequence relationships.

15. The apparatus according to claim 13, wherein the quantity of downlink control channel monitoring occasions is further determined based on a largest subcarrier spacing in subcarrier spacings corresponding to the K downlink frequency domain resources, and a subcarrier spacing of an uplink frequency domain resource on which the HARQ feedback information is located.

16. The apparatus according to claim 13, wherein a maximum quantity of downlink control channel monitoring occasions corresponding to the HARQ feedback information is determined based on a sum of K quantities of K sub downlink control channel monitoring occasions, and the K quantities of the K sub downlink control channel monitoring occasions are determined based on K quantities of parameters in K parameter sets corresponding to the K time sequence relationships.

17. The apparatus according to claim 16, wherein the K quantities of K sub downlink control channel monitoring occasions are further determined based on subcarrier spacings corresponding to the K downlink frequency domain resources and a subcarrier spacing of an uplink frequency domain resource on which the HARQ feedback information is located.

18. An apparatus, comprising:
a memory storing instructions; and
a processor coupled to the memory to execute the instructions to:
send configuration information to a terminal device, wherein the configuration information is used to indicate K time sequence relationships, the K time sequence relationships are respectively used for hybrid automatic repeat request (HARQ) feedback on K downlink frequency domain resources, the K downlink frequency domain resources are configured by a network device for the terminal device, and K is a positive integer greater than or equal to 2; and
receive HARQ feedback information, wherein a quantity of downlink control channel monitoring occasions corresponding to the HARQ feedback information is determined based on a total number of elements in a union of K parameter sets corresponding to the K time sequence relationships.

19. The apparatus according to claim 18, wherein the network device is a radio access network device which configures a plurality of the K downlink frequency domain resources but activates only one of the K downlink frequency domain resources at a time.

20. The apparatus according to claim 18, wherein the quantity of downlink control channel monitoring occasions is further determined based on a largest subcarrier spacing in subcarrier spacings corresponding to the K downlink frequency domain resources, and a subcarrier spacing of an uplink frequency domain resource on which the HARQ feedback information is located.

* * * * *